UNITED STATES PATENT OFFICE.

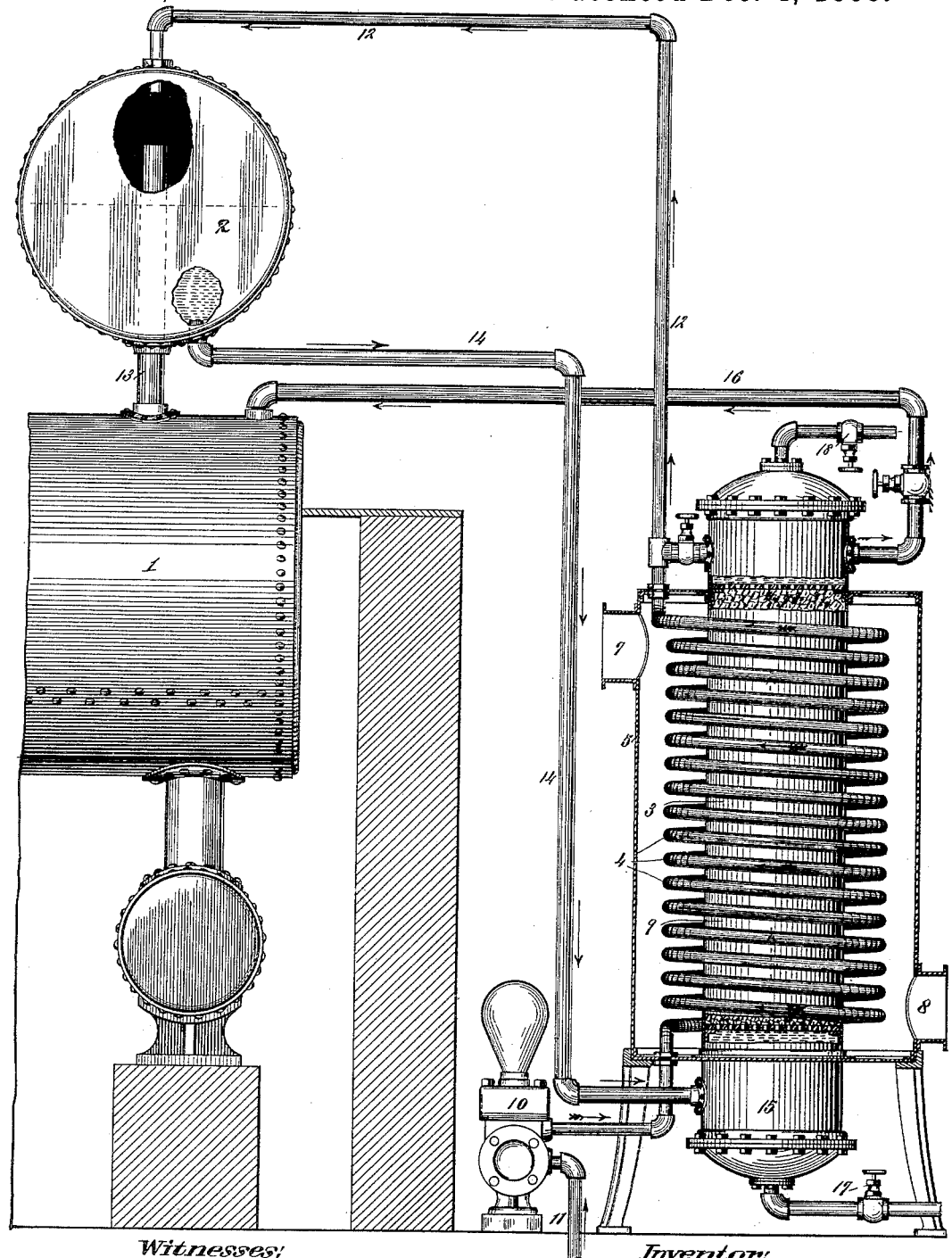

PHILIP ROHAN, OF ST. LOUIS, MISSOURI.

FEED-WATER HEATER.

SPECIFICATION forming part of Letters Patent No. 394,136, dated December 4, 1888.

Application filed May 28, 1888. Serial No. 275,343. (No model.)

*To all whom it may concern:*

Be it known that I, PHILIP ROHAN, a citizen of the United States, residing at St. Louis, in the State of Missouri, have invented certain new and useful Improvements in Feed-Water Heaters and Filters, of which the following is such a full, clear, and exact description as will enable any one skilled in the art to which it appertains to make and use the same, reference being had to the accompanying drawing, forming a part of this specification.

My invention relates more particularly to feed-water heaters and filters that are applied to steam-boilers.
The object of my invention is to filter the feed-water at the highest possible temperature before it enters the boiler, so that all the foreign matter held in suspension in the water may be rendered flocculent, or may be thrown down before passing through the filter to the boiler.

The invention also has for its object the heating of the feed-water by exhaust-steam before delivery to the boiler as a matter of economy.

The invention consists of a heater which may be supplied with heat by exhaust-steam from a boiler, which heater is connected to a receptacle in communication with the steam of the boiler, whereby when the water from the heater is forced into said receptacle said water is under the same pressure, and consequently at the same temperature, as the water of the boiler, said receptacle being connected with the filter, preferably, so that the water will gravitate into said filter, from which the water passes into the boiler itself. The filter is arranged within the heater, so that the temperature of the water is maintained when it is passing through said filter.

I will describe my invention in detail by referring to the accompanying drawing, which shows a portion of a steam-boiler having such an apparatus as I have described connected therewith.

1 is the boiler, and 2 a receptacle, which may be placed above said boiler, or disposed in any other way.

3 is the heater and filter.
In another application, No. 267,451, filed by me on the 17th day of March, 1888, I have described in detail and claimed a filter and heater substantially like the one herein shown; but in the present case I have made a different application of the filter and heater, having changed its operation somewhat to adapt it to the present invention.

4 is a coil of pipe, which may be arranged within a jacket, 5, having ports 7 and 8, through which exhaust-steam is received and discharged. Within this coil is the filter or coke chamber 9, which is similar in every respect to that described in the application herein alluded to. The coil 4 is connected to a pump, 10, which in turn is in communication with a feed-water pipe, 11. The coil 4 is connected at its other end with a pipe, 12, which perforates the receptacle 2 and terminates a short distance within the same. The receptacle 2 is connected with the upper part of the steam-boiler 1 by means of a tube, 13, which passes well up into said receptacle and terminates a short distance from the terminus of the pipe 12. The receptacle 2 is connected by a pipe, 14, to, preferably, the lower part of the filter, which forms a settling-chamber, 15. From thence the water passes upward through the filter to a pipe, 16, which connects the upper chamber of said filter to the boiler. The water passes from the feed-water pipe 11 to the pump 10, where it passes through the coil and pipe 12 to the receptacle 2, the direction being indicated by arrows in the drawing. At the receptacle 2 the water meets the steam which is received into said receptacle by the tube 13. The water is first heated by passing through the coil 4, which heats it to very near 212°. When it reaches the receptacle 2 and encounters the steam in said receptacle, it is heated to the same temperature as the water in the boiler, for the pressure and heat in the receptacle 2 are the same as in the boiler. The water fills the receptacle 2 up to the dotted line and passes from said receptacle through the pipe 14, which is connected with the bottom thereof, to the settling-chamber 15 below the filter. With a pressure of one hundred pounds in the boiler the water and steam will be at a temperature of very near 335°, so that the feed-water being received into the receptacle 2 will be heated to very nearly 335°, adding 123° to the temperature imparted to it by the coil 4, so that the water is delivered to the settling-chamber at nearly 335° before it is filtered. With high temperatures the foreign matter held in suspension becomes more flocculent. At a temperature of 335° eighty-seven per cent. of the matter held in suspension will be precipitated and seven per cent. thereof vaporized, so that by filtering the feed-water at this high temperature almost pure water will be delivered to the boiler, and all scale and incrustation will be prevented from forming in the boiler—a thing which interferes with the successful operation of any boiler and will greatly lessen its economy, and often renders boilers useless, and sometimes causes the plates thereof to become overheated and destroyed. A large portion of the foreign matter settles in the settling-chamber before it is filtered. From the settling-chamber the water passes upward through the filter, where all flocculent particles are arrested, and from thence it passes to the boiler by the pipe 16. The filter being within the steam-jacket 5, the temperature of the water when passing through the filter is maintained, so that the water is delivered to the boiler at not far below 335° and in an almost pure state. By turning the cock 17, the sediment within the settling-chamber may be blown off. So, also, by opening the cock 18 all the scum on the water may be blown off. It will be noted that instead of relying on gravity to feed the water from the receptacle 2 to the settling-chamber a pump could be used instead.

In another application filed by me, and of even date herewith, I claim certain features shown but not claimed in the present case.

Having now fully set forth my invention and described its operation and advantages, what I desire to claim and secure by Letters Patent of the United States as my invention is—

1. A heating and filtering apparatus for the feed-water of steam-boilers, consisting of a coil of pipe through which the feed-water is forced, a jacket surrounding said coil, into which jacket exhaust-steam may be admitted to heat said feed-water, a pipe connecting said coil with a closed receptacle in communication with the steam of a boiler, whereby the heated feed-water is brought to the temperature of the boiler, a second pipe connected with said closed receptacle, a filter surrounded by said coil of pipe and jacket, into which filter the second pipe opens, and a third pipe connecting said filter with the boiler, whereby the feed-water is filtered at boiler temperature before passing into the boiler, and the temperature thereof maintained by exhaust-steam while passing through the filter.

2. The combination, with a steam-boiler, as 1, of a closed receptacle, 2, located above said boiler, a coil, 4, connected with said receptacle by pipe 12, a jacket, 5, surrounding said coil, into which exhaust-steam is admitted, a filter, as 9, surrounded by said coil and jacket, a pump, 10, for forcing the feed-water through said coil into the receptacle 2, a tube, 13, extending up into said closed receptacle communicating with the steam of the boiler, a pipe, 14, connected to a settling-chamber beneath the filter, through which the water is forced by gravity, and a pipe, 16, connecting the upper part of said filter with the boiler, substantially as and for the purpose described.

In testimony whereof I have hereunto set my hand and affixed my seal this 26th day of May, 1888, in the presence of two subscribing witnesses.

PHILIP ROHAN. [L. S.]

Witnesses:
A. C. FOWLER,
M. S. REEDER.